(12) United States Patent
Fukui

(10) Patent No.: US 9,392,136 B2
(45) Date of Patent: Jul. 12, 2016

(54) LIQUID EJECTING APPARATUS THAT CONTROLS EJECTING TIMINGS AND NON-TRANSITORY STORAGE MEDIUM USED IN THE SAME

(75) Inventor: Gen Fukui, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/610,639

(22) Filed: Sep. 11, 2012

(65) Prior Publication Data

US 2013/0063514 A1 Mar. 14, 2013

(30) Foreign Application Priority Data

Sep. 12, 2011 (JP) ................................. 2011-198078

(51) Int. Cl.
| | |
|---|---|
| H04N 1/047 | (2006.01) |
| B41J 13/00 | (2006.01) |
| H04N 1/12 | (2006.01) |
| H04N 1/193 | (2006.01) |

(52) U.S. Cl.
CPC ........... *H04N 1/0473* (2013.01); *B41J 13/0027* (2013.01); *H04N 1/121* (2013.01); *H04N 1/193* (2013.01); *H04N 2201/0471* (2013.01); *H04N 2201/04786* (2013.01)

(58) Field of Classification Search
CPC ........... B41J 3/62; B41J 11/00; B41J 11/004; B41J 11/006; B41J 13/00; B41J 13/0009; B41J 13/0027; B41J 13/036; B41J 13/042; B41J 13/02; B41J 13/03; B41J 29/38; H04N 1/121

USPC .................................................... 347/104, 14
See application file for complete search history.

(56) References Cited

U.S. PATENT DOCUMENTS 5,141,217 A * 8/1992 Lim et al. ................... 271/10.13
5,291,227 A * 3/1994 Suzuki .......................... 347/104
(Continued)

FOREIGN PATENT DOCUMENTS

| JP | 3-2068 A | 1/1991 |
|---|---|---|
| JP | 4-226379 A | 8/1992 |

(Continued)

OTHER PUBLICATIONS

Japanese Office Action issued in JP 2011-198078, mailed Jan. 13, 2015.

*Primary Examiner* — Geoffrey Mruk
*Assistant Examiner* — Scott A Richmond
(74) *Attorney, Agent, or Firm* — Merchant & Gould P.C.

(57) ABSTRACT

In a liquid ejecting apparatus, a recording medium is conveyed by only a first conveying device during a first period, by only a second conveying device during a second period, and by both the first and second conveying device during a third period. The recording medium is conveyed, in theory, at first and second conveying speeds during the first and second periods respectively. A transition period is set from the first period to the third period or from the third period to the second period. The head controller controls a ejecting head during a period prior to the transition upon assuming that the conveying speed is the first conveying speed, during a period after the transition upon assuming that the conveying speed is the second conveying speed, and during the transition period upon assuming that the conveying speed is a third conveying speed between the first and second conveying speeds.

7 Claims, 6 Drawing Sheets

(56) References Cited

U.S. PATENT DOCUMENTS

| | | | |
|---|---|---|---|
| 5,589,858 A | 12/1996 | Kadowaki et al. | |
| 6,652,065 B2* | 11/2003 | Nakagawa | 347/32 |
| 7,883,282 B2* | 2/2011 | Izuchi et al. | 400/76 |
| 2008/0001980 A1 | 1/2008 | Maehira et al. | |
| 2008/0204495 A1* | 8/2008 | Ueno et al. | 347/14 |
| 2008/0231648 A1 | 9/2008 | Tabata et al. | |
| 2008/0232880 A1* | 9/2008 | Noguchi et al. | 399/397 |
| 2008/0284808 A1* | 11/2008 | Kano et al. | 347/12 |
| 2010/0044947 A1* | 2/2010 | Teshigawara et al. | 271/3.15 |
| 2010/0141701 A1* | 6/2010 | Aruga | 347/16 |
| 2011/0142524 A1* | 6/2011 | Saito et al. | 400/578 |
| 2011/0199417 A1* | 8/2011 | Naoi et al. | 347/16 |

FOREIGN PATENT DOCUMENTS

| | | |
|---|---|---|
| JP | 2002-80140 A | 3/2002 |
| JP | 2007-105970 A | 4/2007 |
| JP | 2008-006689 A | 1/2008 |
| JP | 2008-265280 A | 11/2008 |
| JP | 2010-52258 A | 3/2010 |

* cited by examiner

LIQUID EJECTING APPARATUS THAT CONTROLS EJECTING TIMINGS AND NON-TRANSITORY STORAGE MEDIUM USED IN THE SAME

CROSS REFERENCE TO RELATED APPLICATION

This application claims priority from Japanese Patent Application No. 2011-198078 filed Sep. 12, 2011. The entire content of the priority application is incorporated herein by reference.

TECHNICAL FIELD

The present invention relates to a liquid ejecting apparatus that ejects liquid onto a recording medium and a non-transitory storage medium used in the liquid ejecting apparatus.

BACKGROUND

There are known conventional liquid ejecting apparatuses that include a pair of conveying rollers for conveying a recording medium in a conveying direction. Under such a configuration, there may arises a problem that liquid is not ejected onto a prescribed landing position on the recording medium (dots are not formed thereon) when the recording medium is just transferred from one conveying roller disposed upstream in the conveying direction to another conveying roller disposed downstream in the conveying direction. As a result, an image formed on the recording medium is likely to have low image quality. To solve this problem, various technical arts have been proposed.

According to one of such technical arts, an encoder configured to output an encoder signal is provided for each conveying roller. Liquid is ejected from a liquid ejecting head based on a liquid ejecting timing signal that is generated based on the encoder signal. Specifically, the liquid ejecting timing signal is generated based on the upstream encoder signal when a recording medium is conveyed by only the upstream conveying roller or both the upstream conveying roller and the downstream conveying roller. On the other hands, the liquid ejecting timing signal is generated based on the downstream encoder signal when a recording medium is transferred by only the downstream conveying roller. The liquid ejecting apparatus determines that a recording medium is transferred from the upstream conveying roller to the downstream conveying roller, when a phase difference between the upstream encoder signal and the downstream encoder signal is less than or equal to a prescribed threshold value. With this configuration, ejected liquid is less likely to deviate from its prescribed landing position, thereby suppressing degradation in image quality.

SUMMARY

However, in the above-described art, the phase difference does not necessarily become less than or equal to the prescribed value due to various factors just when the recording medium is transferred from the upstream conveying roller to the downstream conveying roller. As the result, the position at which liquid is actually ejected is likely to deviate from its prescribed landing position, leading to degradation of image quality.

In view of the foregoing, it is an object of the present invention to provide a liquid ejecting apparatus capable of suppressing degradation in quality of images formed on a recording medium, even when a plurality of conveying members has a conveying speed different from one another.

Further, it is another object of the present invention to provide a non-transitory storage medium used in the liquid ejecting apparatus.

In order to attain the above and other objects, there is provided a liquid ejecting apparatus includes: a first conveying device configured to convey a recording medium along a conveying path; a second conveying device configured to convey the recording medium conveyed by the first conveying device along the conveying path, the recording medium being conveyed by only the first conveying device during a first period, by only the second conveying device during a second period, and by both the first conveying device and the second conveying device during a third period, the recording medium being conveyed, in theory, at a first conveying speed during the first period and at a second conveying speed that is different from the first conveying speed during the second period; a liquid ejecting head disposed in the conveying path at a position between the first conveying device and the second conveying device and configured to eject liquid onto the recording medium; a transition period setting device configured to set a transition period during which a transition from the first period to the third period or a transition from the third period to the second period can occur; and a head controller configured to control the liquid ejecting head during a period prior to the transition period upon assuming that the recording medium is conveyed at the first conveying speed, configured to control the liquid ejecting head during a period after the transition period upon assuming that the recording medium is conveyed at the second conveying speed, and configured to control the liquid ejecting head during the transition period upon assuming that the recording medium is conveyed at a third conveying speed between the first conveying speed and the second conveying speed.

Another aspect of the present invention provides a non-transitory storage medium storing a set of program instructions executable on a liquid ejecting device including a first conveying device configured to convey a recording medium along a conveying path, a second conveying device configured to convey the recording medium conveyed by the first conveying device along the conveying path, the recording medium being conveyed by only the first conveying device during a first period, by only the second conveying device during a second period, and by both the first conveying device and the second conveying device during a third period, the recording medium being conveyed, in theory, at a first conveying speed during the first period and at a second conveying speed that is different from the first conveying speed during the second period, and a liquid ejecting head disposed in the conveying path at a position between the first conveying device and the second conveying device and configured to eject liquid onto the recording medium. The set of instructions includes: setting a transition period during which a transition from the first period to the third period or a transition from the third period to the second period can occur; and controlling the liquid ejecting head during a period prior to the transition period upon assuming that the recording medium is conveyed at the first conveying speed, configured to control the liquid ejecting head during a period after the transition period upon assuming that the recording medium is conveyed at the second conveying speed, and controlling the liquid ejecting head during the transition period upon assuming that the recording medium is conveyed at a third conveying speed between the first conveying speed and the second conveying speed.

DETAILED DESCRIPTION

An inkjet printer 101 will be described with reference to FIGS. 1 to 6 as a liquid ejecting device according to an embodiment of the present invention.

Throughout the specification, the terms "above", "below", "right", "left", "front", "rear" and the like will be used assuming that the inkjet printer 101 is disposed in an orientation in which it is intended to be used.

Figure 1:
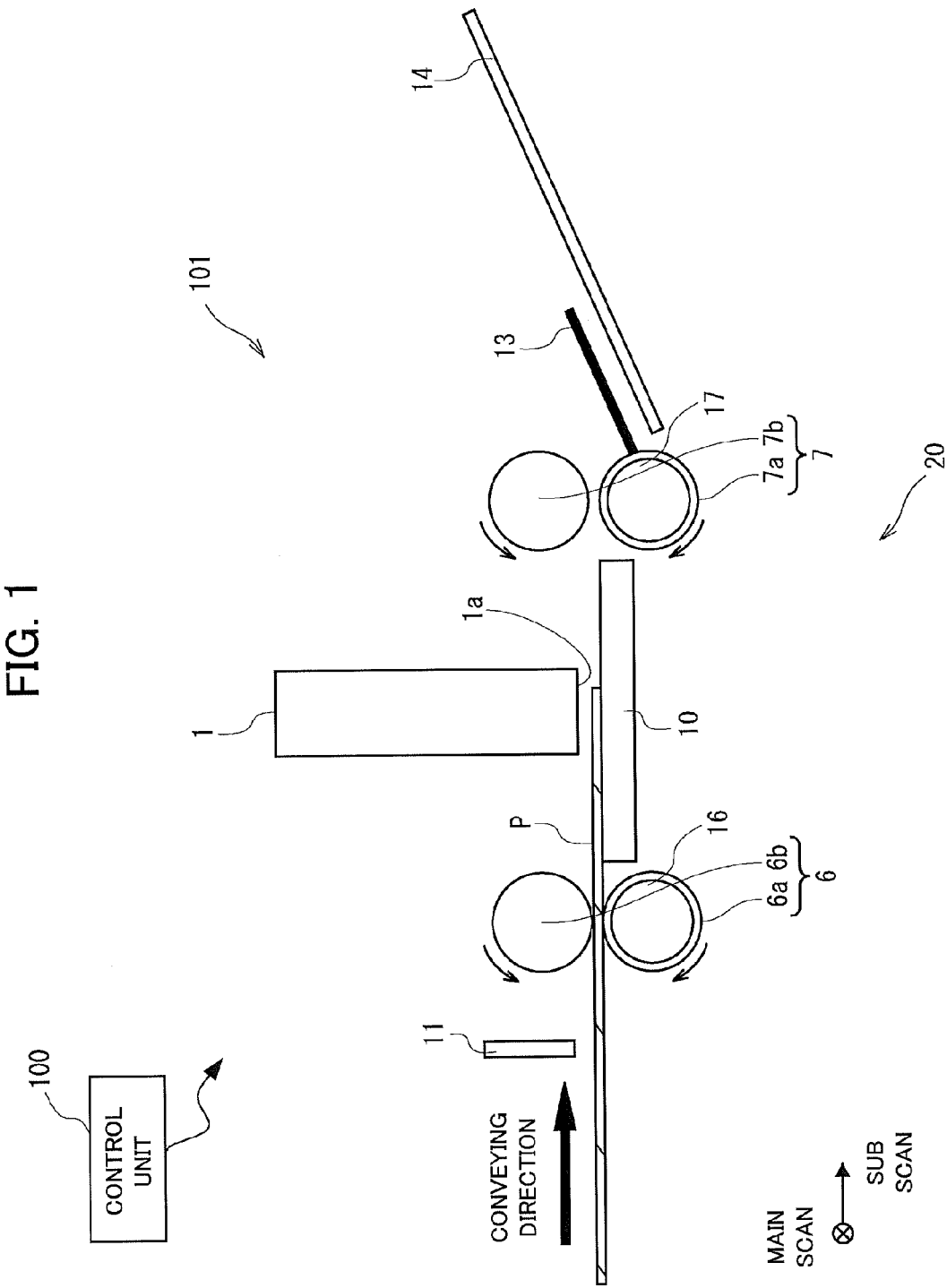
FIG. 1 is a schematic side view of an inkjet printer according to an embodiment of the present invention.

The inkjet printer 101 is a line-type inkjet printer. As shown in FIG. 1, the inkjet printer 101 includes a conveying unit 20, an inkjet head 1, a sheet sensor 11 and a control unit 100. The conveying unit 20 is configured to convey a sheet P along a sheet conveying path. The inkjet head 1 is configured to eject black ink onto the sheet P that is being conveyed by the conveying unit 20. The control unit 100 controls overall operations of the inkjet printer 101.

The conveying unit 20 conveys the sheet P in a sheet conveying direction which is indicated as a thick solid arrow in FIG. 1. The conveying unit 20 includes a first conveying section 6, a second conveying section 7, a platen 10, a peeling plate 13, and a discharge tray 14.

The first conveying section 6 includes a pair of conveying rollers 6a and 6b, and a first motor 30 (see FIG. 4) configured to drive the conveying rollers 6a and 6b. The conveying rollers 6a and 6b rotate in a direction opposite to each other (see arrows shown in the first conveying section 6 in FIG. 1) to convey the sheet P supplied from a sheet feeding unit (not shown) in the sheet conveying direction while nipping the sheet P therebetween. The first conveying section 6 is controlled to convey the sheet P at a first conveying speed V1.

The conveying roller 6a has a rotational shaft at which a first rotary encoder 16 is disposed. The first rotary encoder 16 is configured to detect a rotational speed of the conveying roller 6a, and output pulse signals corresponding to the rotation of the conveying roller 6a to the control unit 100.

The second conveying section 7 includes a pair of conveying rollers 7a and 7b, and a second motor 40 (see FIG. 4) configured to drive the conveying rollers 7a and 7b. The conveying rollers 7a and 7b rotate in a direction opposite to each other (see arrows shown in the second conveying section 7 in FIG. 1) to receive the sheet P from the first conveying section 6 and convey the sheet P downstream in the sheet conveying direction while nipping the sheet P therebetween.

The second conveying section 7 is controlled to convey the sheet P at a second conveying speed V2 faster than first conveying speed V1. With this configuration, the sheet P is conveyed with a prescribed tension applied thereto. The sheet P is thus prevented from going slack between the first conveying section 6 and the second conveying section 7. As a result, images can be formed with evenness on the tensioned sheet P, and the formed image can therefore obtain enhanced image quality.

The conveying roller 7a has a rotational shaft at which a second rotary encoder 17 is disposed. The second rotary encoder 17 is configured to detect a rotational speed of the conveying rollers 7a and 7b, and output pulse signals corresponding to the rotation of the conveying rollers 7a to the control unit 100.

Further, in the present embodiment, the conveying rollers 6a and 6b are configured to nip the sheet P therebetween with a nipping force greater than that of the conveying rollers 7a and 7b.

The platen 10 is disposed between the first conveying section 6 and the second conveying section 7 in the sheet conveying direction. The platen 10 serves to support the sheet P from below while the sheet P is conveyed by the first conveying section 6 and the second conveying section 7.

The peeling plate 13 is disposed downstream of the second conveying section 7 in the sheet conveying direction. The peeling plate 13 serves to peel off the sheet P from respective outer circumferential surfaces of the conveying roller 7a. The peeled-off sheet P is then stacked in the discharge tray 14.

The inkjet head 1 is disposed between the first conveying section 6 and the second conveying section 7 in the sheet conveying direction, and extends in a main scanning direction which is perpendicular to the sheet conveying direction and parallel to a horizontal direction. The inkjet head 1 has a lower surface 1a serving as an ejecting surface 1a. A plurality of ejecting ports (not shown) is formed on the ejecting surface 1a from which ink is ejected. The ejecting surface 1a is disposed in confrontation with an upper surface of the platen 10 with a predetermined suitable gap formed therebetween. The inkjet head 1 ejects black ink droplets toward the sheet P through the plurality of ejecting ports when the sheet P passes vertically below the ejecting surface 1a. A desired monochrome image is thus formed on the sheet P.

The sheet sensor 11 is disposed upstream of the first conveying section 6 in the sheet conveying direction, more specifically, between the sheet feeding unit (not shown) and the first conveying section 6. The sheet sensor 11 serves to detect passing of the sheet P on the sheet conveying path. More specifically, the sheet sensor 11 outputs a detection signal to the control unit 100 when the sheet sensor 11 detects that the sheet P passes beneath the sheet sensor 11 on the sheet conveying path.

Next, how the sheet P is conveyed by the conveying unit 20 according to the present embodiment will be described.

Figure 2:
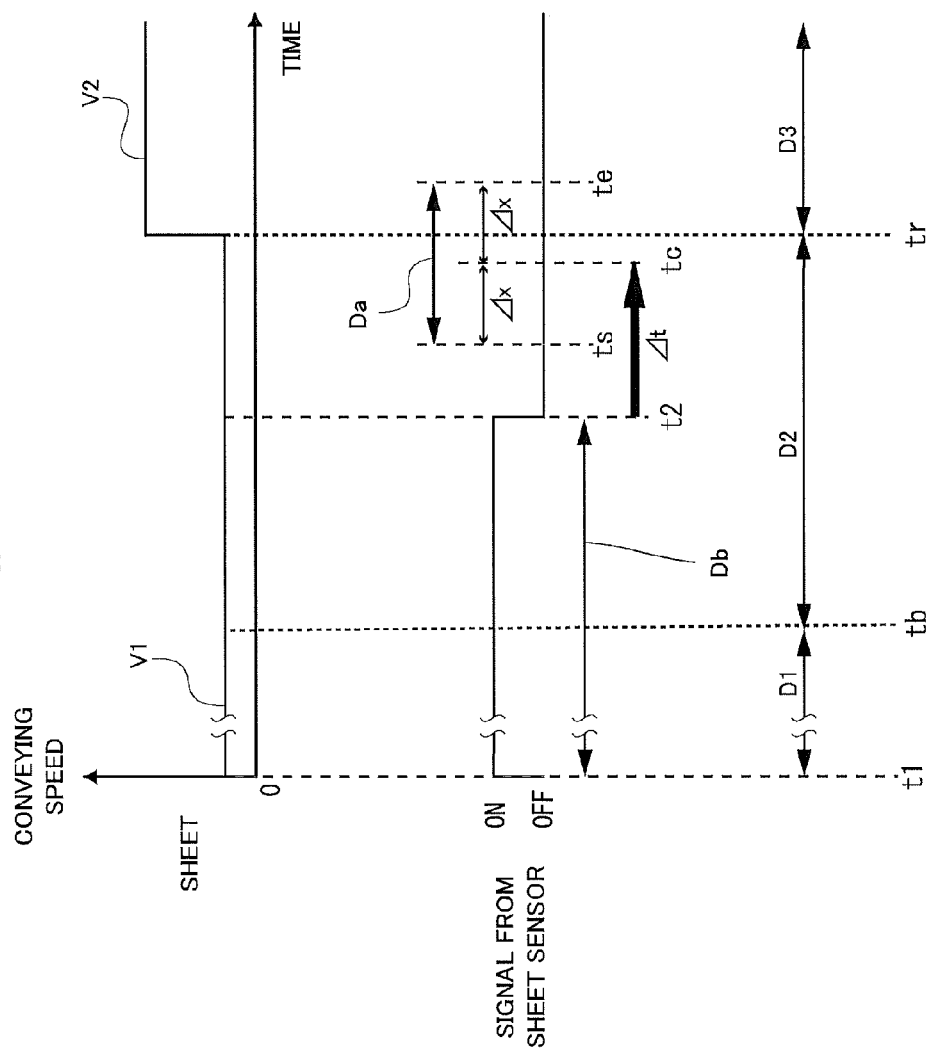
FIG. 2 is a graph illustrating a variation over time in a relationship between a sheet conveying speed and an output signal of a sheet sensor.

First, the sheet P conveyed from the sheet feeding unit (not shown) is nipped and conveyed by only the first conveying section 6. As shown in FIG. 2, the sheet sensor 11 detects the leading end of the sheet P at a time t1. A period of time during which the sheet P is conveyed by only the first conveying section 6 will be referred to as a "first period of time D1." The sheet P is conveyed at the first conveying speed V1 during the first period of time D1 in theory.

Figure 3A:
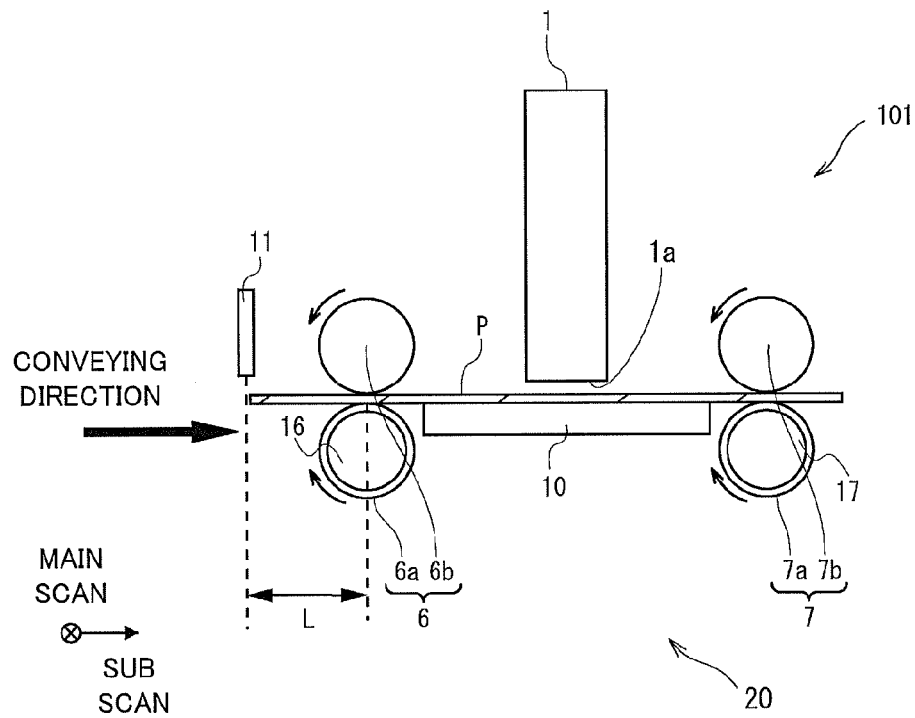
FIG. 3A is a view explaining a state where a recording sheet is being nipped by two conveying units of FIG. 1.

Subsequently when a leading end of the sheet P reaches the second conveying section 7, as shown in FIG. 3A, the sheet P is conveyed by both the first conveying section 6 and the second conveying section 7. As shown in FIG. 2, a period of time during which the sheet P is conveyed by both the first conveying section 6 and the second conveying section 7 will be referred to as a "second period of time D2." During the second period of time D2, the sheet P is mainly conveyed by a conveying force of the first conveying section 6 since the nipping force of the conveying rollers 6*a*, 6*b* is greater than that of the conveying rollers 7*a*, 7*b* as described above. Therefore, the sheet P is also conveyed at the first conveying speed V1 during the second period of time D2 in theory.

Figure 3B:
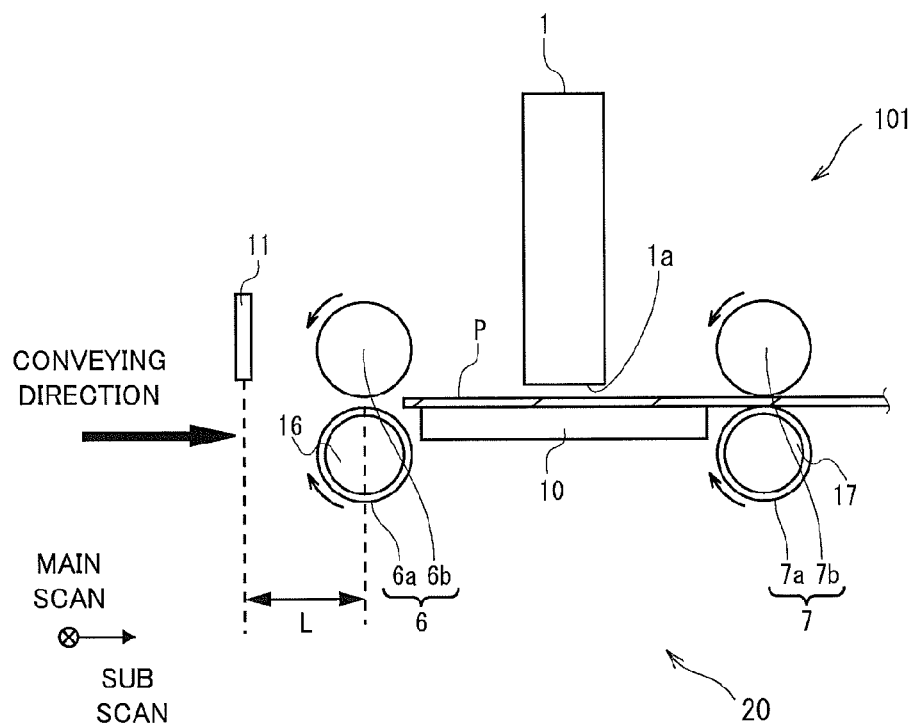
FIG. 3B is a view explaining a state where the recording sheet is being nipped by only one of the conveying units of FIG. 1.

When a trailing end of the sheet P is released from nipping of the first conveying section 6, as shown in FIG. 3B, the sheet P is then nipped and conveyed by only the second conveying section 7. As shown in FIG. 2, a period of time during which the sheet P is conveyed by only the second conveying section 7 will be referred to as a "third period of time D3." The sheet P is conveyed at the second conveying speed V2 during the third period of time D3 in theory.

Incidentally, in order to form a high-quality image on the sheet P, the inkjet head 1 should eject ink at timings corresponding to the conveying speed of the sheet P. In case of the present embodiment, therefore, the inkjet head 1 should eject ink at timings corresponding to the first conveying speed V1 during both the first period of time D1 and the second period of time D2, and should eject ink at timings corresponding to the second conveying speed V2 during the third period of time D3. Hence, an accurate point of time at which the conveying speed of the sheet P is switched from the first conveying speed V1 to the second conveying speed V2, that is, the trailing end of the sheet P is released from nipping of the first conveying section 6 (the sheet P is transferred from the first conveying section 6 to the second conveying section 7) is required for switching the timings.

As shown in FIG. 2, if the first conveying speed V1 is constant, the sheet P is transferred from the first conveying section 6 to the second conveying section 7 at a time tr that is calculated from both the first conveying speed V1 and a distance L between the sheet sensor 11 and the nipping portion of the conveying rollers 6*a*, 6*b*. Hereinafter, this point of time tr will be referred to as a "theoretical transfer time tr." More specifically, the theoretical transfer time tr comes after a period of time obtained by dividing the distance L by the first conveying speed V1 has elapsed from a time t2 at which the sheet sensor 11 detects the trailing end of the sheet P. Note that if the conveying speed of the sheet P in a period prior to the first period of time D1 is different from the first conveying speed V1, the theoretical transfer time tr may be calculated in consideration of such difference.

In practice, however, the first conveying speed V1 (rotational speed of the conveying rollers 6*a* and 6*b*) may vary due to various factors. For example, due to errors at the time of manufacture of the conveying rollers 6*a* and 6*b*, the first conveying speed V1 may cyclically vary. Further, the first conveying speed V1 may also vary due to fluctuation in friction torque applied from the sheet P during conveyance thereof. Specifically, the friction torque applied from the sheet P to the first conveying section 6 varies depending on, for example, a thickness of the sheet P that is in contact with the nipping portion of the conveying rollers 6*a* and 6*b*, properties of the sheet P in terms of moisture content, and the nipping force of the conveying rollers 6*a* and 6*b*. For example, if the moisture content is different between the leading end and the trailing end in a single sheet P, the conveying speed of the sheet P when the conveying rollers 6*a*, 6*b* nip the leading end of the sheet P is different from that when the conveying rollers 6*a*, 6*b* nip the trailing end of the sheet P.

Furthermore, torque (conveying force) is applied to the sheet P from both of the first conveying section 6 and the second conveying section 7 during the second period of time D2, whereas torque is applied to the sheet P from only the first conveying section 6 during the first period of time D1. Therefore, in fact, the conveying speed V1 during the second period of time D2 is slightly different from that during the first period of time D1.

Due to the various factors described above, the first conveying speed V1 may vary. As a result, the theoretical transfer time tr obtained with the above-described calculation may be different from an actual transfer time. Further, the theoretical transfer time tr may be different from the actual transfer time due to reasons other than variation in the first conveying speed V1, for example, due to detection errors at the sheet sensor 11.

When the actual transfer time is deviated from the theoretical transfer time tr, ink droplets ejected from the inkjet head 1 may land on the sheet P at positions deviated from their preset landing positions during a period between the theoretical transfer time tr and the actual transfer time. Such deviation of ink from its preset landing position is reflected in a formed image as a band extending in the main scanning direction. Therefore, no matter how small the deviation is, degradation in image quality may occur.

More specifically, when the actual transfer time is earlier than the theoretical transfer time tr, ink is ejected from the inkjet head 1 assuming that the sheet P is conveyed at the second conveying speed V2 even though the sheet P is actually conveyed at the first conveying speed V1. Similarly, when the actual transfer time is later than the theoretical transfer time tr, ink is ejected assuming that the sheet P is conveyed at the first conveying speed V1 even though the sheet P is actually conveyed at the second conveying speed V2. In either case, actual landing positions of ink are offset from the prescribed landing positions.

In order to minimize deviation of ink from its preset landing position, the control unit 100 according to the present embodiment is configured to adjust, during a period of time Da (see FIG. 2), timings at which ink droplets are ejected from the inkjet head 1. The period of time Da is a time span during which the sheet P may possibly be transferred from the first conveying section 6 to the second conveying section 7. This period of time Da will be referred to as a "transition period Da" hereinafter.

An internal configuration of the control unit 100 will now be described with reference to FIG. 4.

The control unit 100 includes a CPU, a ROM and a RAM (all not shown). The ROM rewritably stores programs executed by the CPU and data for the programs, and the RAM temporarily stores data while the programs are executed. The ROM stores control programs according to the present embodiment. Upon execution of the control programs by the CPU, each functional unit constituting the control unit 100 shown in FIG. 4 is realized.

Figure 4:
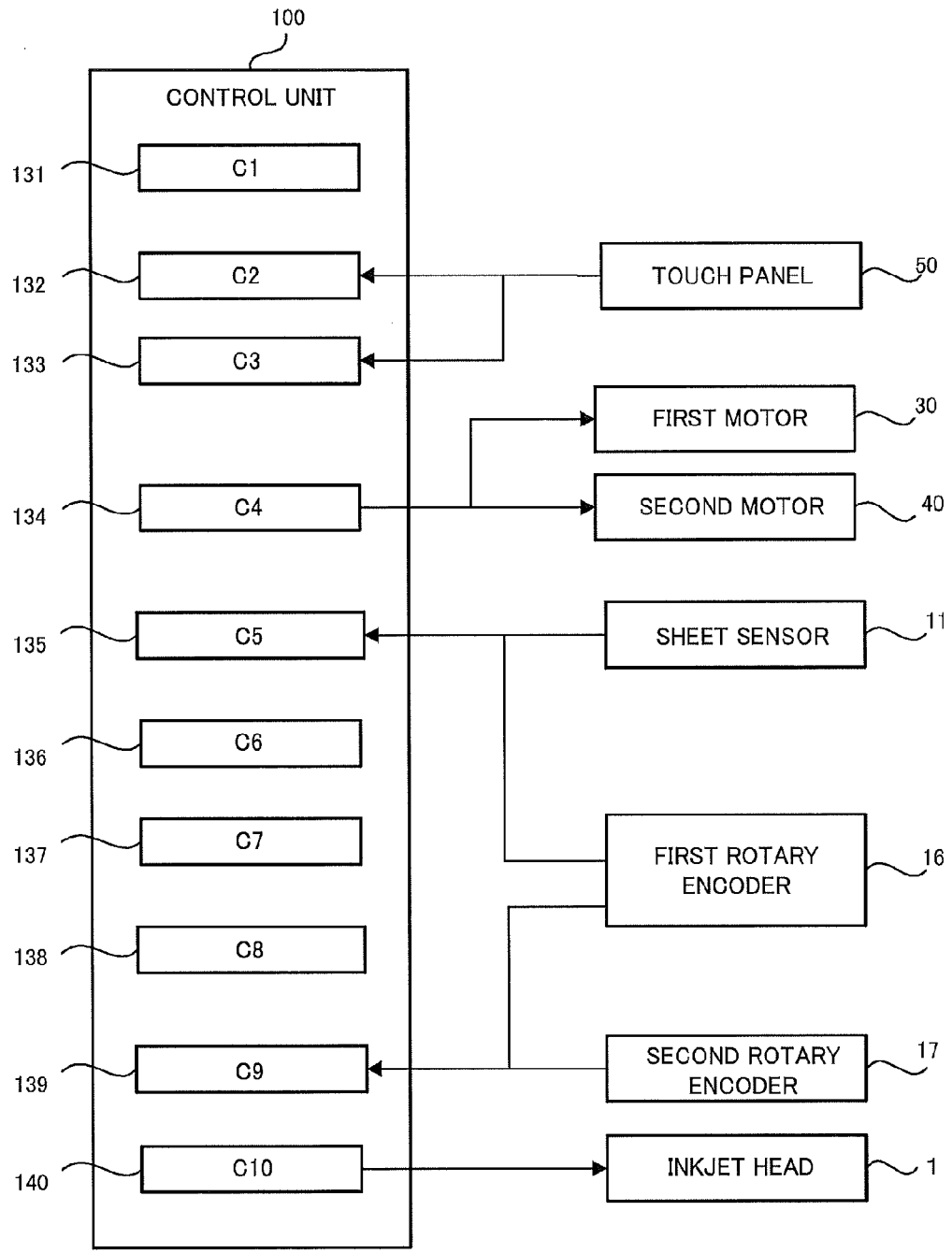
FIG. 4 is a block diagram showing functional units of a controller of FIG. 1.

As shown in FIG. 4, the control unit 100 includes an image data storing section 131, a conveying speed storing section 132, a sheet type storing section 133, a conveyance control section 134, an average conveying speed calculating section 135, a transition period determining section 136, a time lag storing section 137, a virtual (third) conveying speed determining section 138, an ejection timing generating section 139 and a head controlling section 140.

The control unit 100 receives data relating to an image to be printed on the sheet P from an external source and generates image data based on the data. The image data storing section 131 functions to store the image data. The image data includes density value of black ink for each of a plurality of pixels (resolution) of the image to be formed on the sheet P. The plurality of pixels consists of pixels arranged in the sheet conveying direction and pixels arranged in the main scanning direction. The density value is quantized to four values respectively corresponding to no ejection, a small droplet, a medium droplet and a large droplet.

The conveying speed storing section 132 functions to store a target conveying speed of the next sheet P in the conveying unit 20 (an average conveying speed of the sheet P in a range between the sheet feeding unit and the discharge tray 14). A user can input the target conveying speed of the next sheet P via a touch panel 50. In the present embodiment, it is assumed that the first conveying speed V1 and the second conveying speed V2 are inputted as the target conveying speed.

The sheet type storing section 133 functions to store a type (for example, high-quality paper and photo paper) and a sheet size of the next sheet P conveyed by the conveying unit 20. The user can input the type and sheet size of the sheet P via the touch panel 50.

The conveyance control section 134 functions to control the first motor 30 and the second motor 40 such that the sheet P is conveyed in the sheet conveying direction at the target conveying speed stored in the conveying speed storing section 132. Specifically, the conveyance control section 134 controls the first motor 30 such that the sheet P is conveyed at the first conveying speed V1 and controls the second motor 40 such that the sheet P is conveyed at the second conveying speed V2 faster than the first conveying speed V1.

The average conveying speed calculating section 135 functions to calculate a first average conveying speed V1$a$ of the sheet P during a period of time Db (see FIG. 2) which is a time span from the time t1 (when the sheet sensor 11 detects the leading end of the sheet P) until the time t2 (when the sheet sensor 11 detects the trailing end of the sheet P). Specifically, the average conveying speed calculating section 135 counts the pulse signals outputted from the first rotary encoder 16 during the period of time Db, and calculates the first average conveying speed V1$a$ based on the number of the pulse signals. Hereinafter, this period of time Db will be referred to as an "average conveying speed calculation period Db."

In the present embodiment, the average conveying speed calculation period Db is defined as a period between the time t1 and the time t2. However, other period of time may be used as the average conveying speed calculation period Db, provided that the sheet P is conveyed by only the first conveying section 6. For example, referring to FIG. 2, the average conveying speed calculation period Db may be defined as a time span from a time tb until the time t2, the time tb being a point of time at which the leading end of the sheet P reaches the second conveying section 7.

The transition period determining section 136 functions to calculate and store the transition period Da (the period during which the sheet P may possibly be transferred from the first conveying section 6 to the second conveying section 7). Specifically, firstly, the transition period determining section 136 divides the distance L between the sheet sensor 11 and the nipping portion of the conveying rollers 6$a$, 6$b$ (see FIGS. 3A, 3B) by the first average conveying speed V1$a$ calculated by the average conveying speed calculating section 135 to obtain a time Δt. The transition period determining section 136 then adds the obtained time Δt to the time t2 to determine a projected transfer time tc at which the sheet P is transferred from the first conveying section 6 to the second conveying section 7.

Then, the transition period determining section 136 determines a time lag Δx before and after the projected transfer time tc in view of the fluctuation in the conveying speed of the sheet P after the time t2. The time lag Δx is determined based on both the target conveying speed stored in the conveying speed storing section 132 and the type and sheet size of the sheet P stored in the sheet type storing section 133, while referring to the time lag storing section 137 (described next). Then, the transition period determining section 136 derives a time ts by subtracting the time lag Δx from the projected transfer time tc and stores the time ts as a starting point of the transition period Da. Likewise, the transition period determining section 136 derives a time te by adding the time lag Δx to the projected transfer time tc and stores the time te as an ending point of the transition period Da.

The time lag storing section 137 stores a plurality of time lags Δx corresponding to the conveying speed, the thickness, and the sheet size of the sheet P. Specifically, the time lag Δx is set to a value that becomes greater in proportion to an increase in any one of the conveying speed, the thickness, and the sheet size of the sheet P.

More specifically, the aforementioned fluctuations in the conveying speed of the sheet P are likely to be more intense as the conveying speed increases. Further, the friction torque applied from the sheet P to the first conveying section 6 and the second conveying section 7 is likely to increase as the thickness of the sheet P is thicker, and as the sheet size of the sheet is larger. Hence, the time lag storing section 137 stores the plurality of time lags Δx such that the time lag Δx becomes longer as the conveying speed of the sheet P is faster, as the thickness of the sheet P is thicker, and as the sheet size of the sheet P is larger. This plurality of time lags Δx may be stored in a form of a table or as a formula for computation.

Figure 5A:
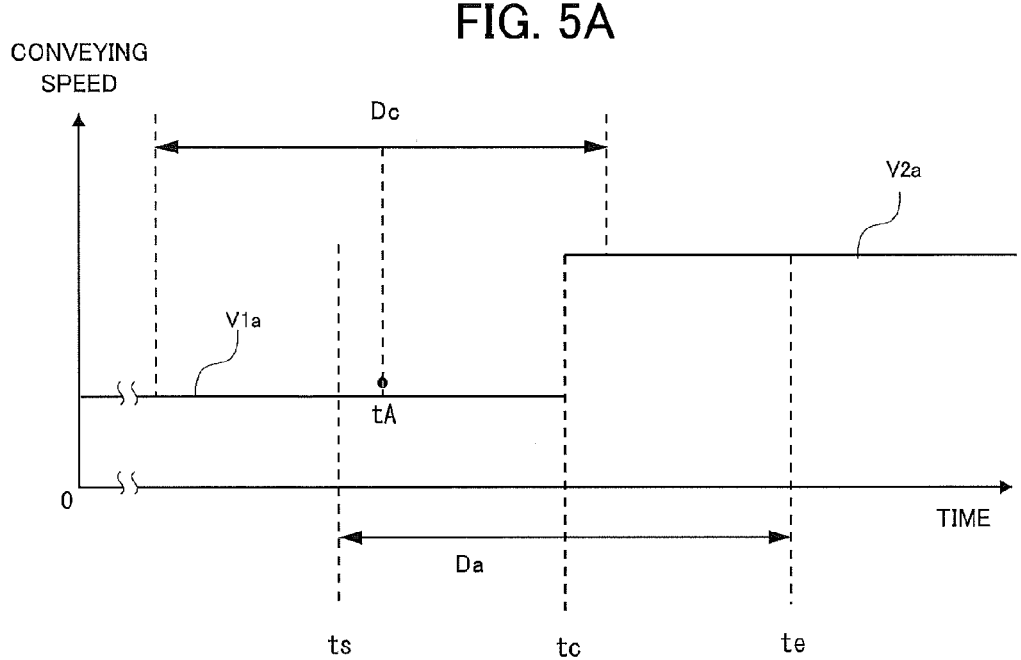
FIG. 5A is a graph explaining how to calculate the sheet conveying speed during a period Da.

The virtual conveying speed determining section 138 functions to determine a third conveying speed V3 of the sheet P that is a virtual conveying speed of the sheet P during the transition period Da as follows. FIG. 5A is a graph explaining how to calculate the third conveying speed V3 during the period Da, and FIG. 5B is a graph illustrating change of the third conveying speed V3 during the period Da.

First, as shown in FIG. 5A, the virtual conveying speed determining section 138 determines a second average conveying speed V2$a$ of the sheet P when sheet P is conveyed by only the conveying force of the second conveying section 7. The second average conveying speed V2$a$ is experimentally calculated beforehand based on both the target conveying speed stored in the conveying speed storing section 132 and the type and sheet size of the sheet P stored in the sheet type storing section 133, and stored in the virtual conveying speed determining section 138.

Then, the virtual conveying speed determining section 138 determines, based on both the first average conveying speed V1$a$ and the second average conveying speed V2$a$, the third conveying speed V3 at any arbitrary point of time tA during the transition period Da. The third conveying speed V3 at each point of time tA is obtained by averaging the conveying speeds over a calculation period Dc (see FIG. 5A). The calculation period Dc is defined such that, the point of time tA is positioned at a center in each calculation period Dc in terms of time and has a time span equal to or longer than that of the transition period Da.

Figure 5B:
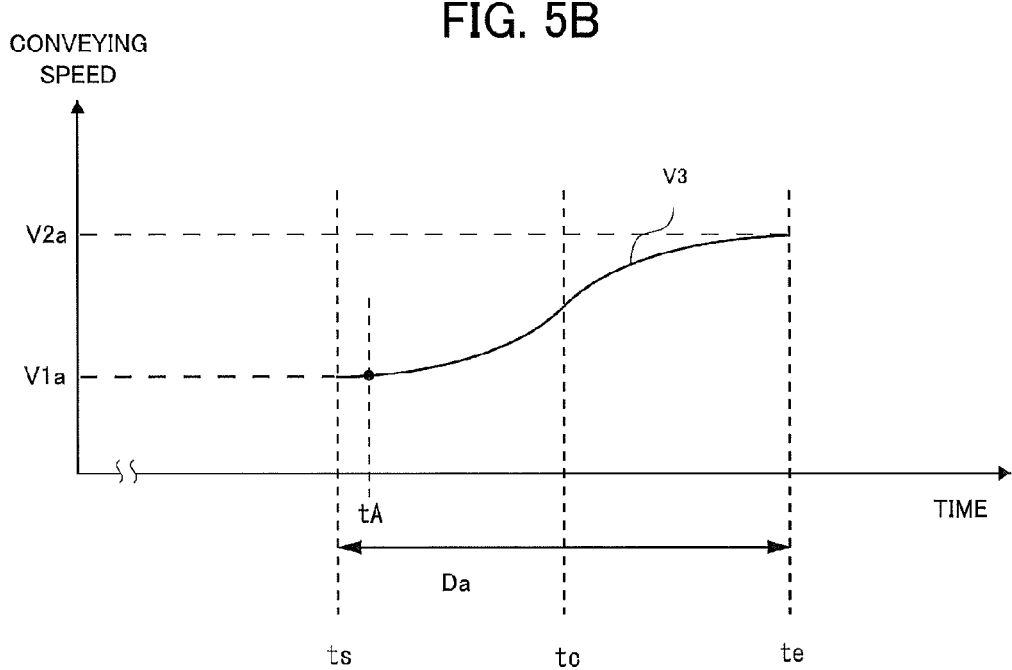
FIG. 5B is a graph illustrating change of the sheet conveying speed during the period Da.

Each value obtained in this way as the third conveying speed V3 for every point of time tA during the whole transition period Da is shown in FIG. 5B. The third conveying speed V3 continuously changes over time from the first average conveying speed V1$a$ toward the second average conveying speed V2$a$ during the transition period Da. As shown in FIG. 5B, the third conveying speed V3 at the point of time tA is closer to the second average conveying speed V2$a$ than the third conveying speed V3 at some other point of time before the point of time tA.

The ejection timing generating section 139 functions to generate ejection timing signals such that the image corresponding to the image data stored in the image data storing section 131 is formed on the sheet P, and sequentially output the generated ejection timing signals to the head controlling section 140. Time intervals at which the ejection timing signals are generated are determined according to the conveying speed of the sheet P, so that each ejection timing signal is generated each time the sheet P is conveyed for a predetermined distance in the sheet conveying direction.

Figure 6:
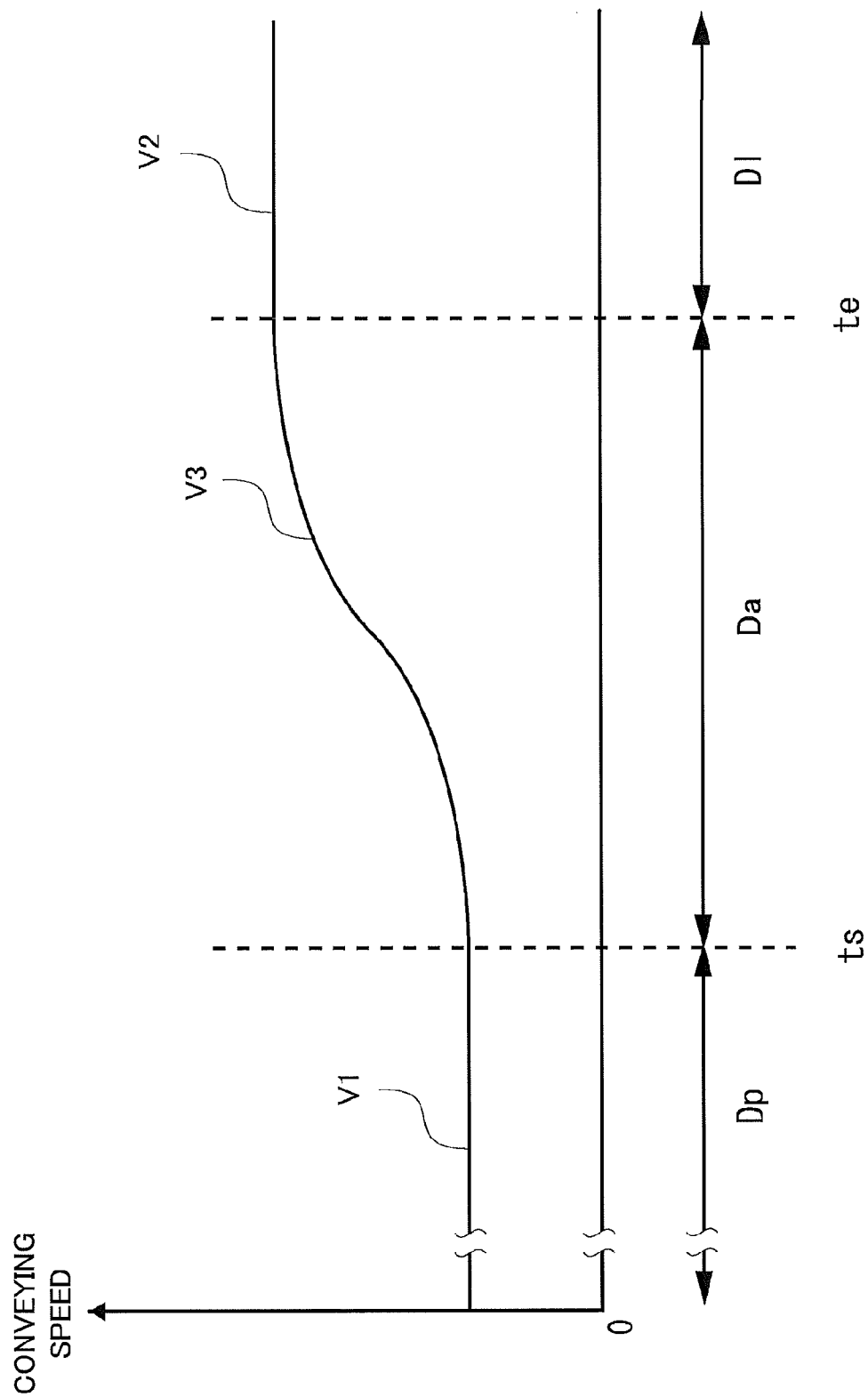
FIG. 6 is a graph explaining how liquid is controlled to be ejected from the inkjet head of FIG. 1 depending on the sheet conveying speed.

More specifically, referring to FIG. 6, for a period of time Dp (a period prior to the time is that is the starting point of the transition period Da), the time intervals are determined based on intervals at which the first rotary encoder 16 outputs the pulse signals. In other words, for the period of time Dp, the ejection timing signals are generated based on the first conveying speed V1 (rotational speed of the conveying rollers 6a and 6b).

For the transition period Da, the virtual conveying speed calculating section 138 generates the ejection timing signals based on the third conveying speed V3. Since the ejection timing signals are generated according to the third conveying speed V3 during the transition period Da, ink can be suppressed from getting deviated from its prescribed landing position on the sheet P.

For a period of time Dl (a period after to the time to that is the ending point of the transition period Da), the time intervals are determined based on intervals at which the second rotary encoder 17 outputs the pulse signals. In other words, for the period of time Dl, the ejection timing signals are generated based on the second conveying speed V2 (rotational speed of the conveying rollers 6a and 6b).

The head controlling section 140 functions to control ejection of ink from the inkjet head 1 according to the ejection timing signals outputted from the ejection timing generating section 139. In accordance with the control of the head controlling section 140, the inkjet head 1 ejects ink droplet having a certain volume onto the sheet P conveyed by the conveying unit 20 to form the image corresponding to the image data stored in the image data storing section 131 on the sheet P.

As described above, according to the inkjet printer 101 of the present embodiment, the inkjet head 1 ejects ink upon assuming that the sheet P is conveyed at the third conveying speed V3, which is faster than the first average conveying speed V1a but slower than second average conveying speed V2a, during the transition period Da in which the sheet P may possibly be transferred from the first conveying section 6 to the second conveying section 7. Hence, deviation of ink from its prescribed landing position can be suppressed, thereby inhibiting degradation in image quality of the image formed on the sheet P. That is, actual difference in the conveying speed of the sheet P can be rendered to a value smaller than a difference between the second average conveying speed V2a and the first average conveying speed V1a.

Further, the first average conveying speed V1a is not experimentally calculated beforehand, but is obtained by actually counting the pulse signals outputted from the first rotary encoder 16. Therefore, the third conveying speed V3 derived from the first average conveying speed V1a can thus be considered more suitable and reliable.

Further, according to the inkjet printer 101 of the present embodiment, the ejection timing generating section 139 is configured to generate the ejection timing signals based on the actual conveying speed of the sheet P. That is, the ejection timing signals are derived from the pulse signals outputted from the first rotary encoder 16 during the period of time Dp (before the transition period Da), and from the second rotary encoder 17 during the period of time Dl (after the transition period Da). Hence, enhanced image quality can be obtained with respect to the image formed on the sheet P.

Further, the third conveying speed V3 at any arbitrary point of time tA during the transition period Da is determined as a value closer to the second average conveying speed V2a, compared to the third conveying speed V3 at another point of time before the time tA during the transition period Da. In other words, the third conveying speed V3 can be set in proportion to a possibility that the transfer of the sheet P from the first conveying section 6 to the second conveying section 7 has been completed. Therefore, degradation in image quality of the image formed on the sheet P can be suppressed further appropriately.

Further, the third conveying speed V3 during the transition period Da is configured to continuously change from the first average conveying speed V1a toward the second average conveying speed V2a, as shown in FIG. 5B. Therefore, ink is controlled to be ejected from the inkjet head 1 during the transition period Da, assuming that the conveying speed of the sheet P is changing from the first average conveying speed V1a to the second average conveying speed V2a. As a result, deviation in landing positions of ink droplets possibly caused at the time of actual transfer of the sheet P from the first conveying section 6 to the second conveying section 7 is less likely to be visually confirmed.

Further, the time lag $\Delta x$ is set longer as the conveying speed of the sheet P by the conveying unit 20 (i.e., by the first conveying section 6 and the second conveying section 7) is faster, leading to prolongation of the transition period Da. Also, the time lag $\Delta x$ is set so as to become longer as the sheet size of the sheet P conveyed by the conveying unit 20 is larger, making the transition period Da longer. With this configuration, since the transition period Da can be set longer when errors in calculating the transition period Da are likely to occur, the image formed on the sheet P can be reliably suppressed from having a lower image quality.

<Modifications>

While the invention has been described in detail with reference to the embodiment thereof, it would be apparent to those skilled in the art that various changes and modifications may be made therein without departing from the spirit of the invention.

For example, in the depicted embodiment, the nipping force of the conveying rollers 6a and 6b is set to be greater than that of the conveying rollers 7a and 7b. However, alternatively, the nipping force of the conveying rollers 6a, 6b may be set so as to be smaller than that of the conveying rollers 7a and 7b. If this is the case, the sheet P is conveyed at the second conveying speed V2 of the second conveying section 7 during the second period of time D2 in which the sheet P is conveyed by both the first conveying section 6 and the second conveying section 7. Therefore, a period during which the leading end of the sheet P possibly reaches a nipping portion of the conveying rollers 7a, 7b is adopted as the transition period Da. Further, in this case, the transition period determining section 136 may add an amount of time $\Delta t$ to the time t1 (when the sheet sensor 11 detects the leading end of the sheet P) to virtually determine the projected transfer time tc, the amount of time $\Delta t$ being obtained by diving a distance L between the sheet sensor 11 and the nipping portion of the conveying rollers 7a, 7b by the first average conveying speed V1a.

Further, the sheet sensor 11 of the above embodiment is configured to detect the availability of the sheet P at a position between the sheet feeding unit (not shown) and the first conveying section 6 on the sheet conveying path. Instead, the sheet sensor 11 may detect the availability of the sheet P at a position different from that of the above embodiment on the sheet conveying path, provided that the position is upstream of the second conveying section 7 in the sheet conveying path. For example, the sheet sensor 11 may detect whether or not the sheet P is conveyed between the first conveying section 6 and the second conveying section 7. It should be noted, however, in the latter case, since the sheet sensor 11 needs to detect the availability of the sheet P before the transition period Da is started, the sheet sensor 11 should be disposed at a position upstream of and away from the second conveying section 7 by a prescribed distance in the sheet conveying path, the distance being obtained by multiplying the transition period Da by the first conveying speed V1.

Further, although the user inputs the target conveying speed of the sheet P via the touch panel 50 in the above-described embodiment, the target conveying speed may be inputted externally from outside of the inkjet printer 101. Alternatively, the target conveying speed may be set to a certain value in case that the conveying speed is not inputted. Still alternatively, the conveying speed of the sheet P may be preset (stored) as a constant value, without providing any inputting means.

Further, the type and sheet size of the sheet P may be inputted externally, instead of user's inputting the same via the touch panel 50 as in the depicted embodiment.

Further, in the depicted embodiment, the time lag $\Delta x$ is set so as to be longer as the thickness of the sheet P is thicker and the sheet size of the sheet P is larger. However, the time lag $\Delta x$ may be set as a common value regardless of the thickness and the sheet size of the sheet P.

Further, the third conveying speed V3 is configured to continuously change from the first average conveying speed V1$a$ to the second average conveying speed V2$a$ in the above-described embodiment. However, the third conveying speed V3 may be set such that the third conveying speed V3 changes from the first average conveying speed V1$a$ to the second average conveying speed V2$a$ in a stepwise manner. In the latter case as well, ink is ejected from the inkjet head 1 during the transition period Da based on an assumption that the conveying speed of the sheet P is changing toward the second average conveying speed V2$a$ from the first average conveying speed V1$a$, as in the depicted embodiment. Therefore, deviation in landing position of ink that is possibly caused by transfer of the sheet P from the first conveying section 6 to the second conveying section 7 is less likely to be observed on the sheet P. Still alternatively, the third conveying speed V3 during the transition period Da may be set to a particular constant speed, provided that the speed is between the first conveying speed V1 (the speed at which the sheet P is conveyed by only the conveying force of the first conveying section 6) and the second conveying speed V2 (the speed at which the sheet P is conveyed by only the conveying force of the second conveying section 7).

Further, the first conveying section 6 and the second conveying section 7 of the above embodiment are respectively configured of the pair of conveying rollers 6*a*, 6*b* and the pair of conveying rollers 7*a*, 7*b*. However, each of the first conveying section 6 and the second conveying section 7 may be configured of a drive roller, a follower roller and a conveying belt mounted over the drive roller and the follower roller.

Further, in the depicted embodiment, the first average conveying speed V1$a$ and the second average conveying speed V2$a$ are used for calculation of the third conveying speed V3. However, instead of the first average conveying speed V1$a$ and the second average conveying speed V2$a$, the first conveying speed V1 and the second conveying speed V2 may be simply used for obtaining the third conveying speed V3. In other words, instead of using measured values, values pre-stored in the conveying speed storing section 132 may be used to calculate the third conveying speed V3.

Further, although the first conveying speed V1 is slightly slower than the second conveying speed V2 in the depicted embodiment, the first conveying speed V1 may be slightly faster than the second conveying speed V2. In this case as well, processing identical to that of the depicted embodiment is executed to calculate the third conveying speed V3, regardless of which of the first conveying section 6 and the second conveying section 7 has a larger nipping force relative to the other. Specifically, the third conveying speed V3 is set in proportion to the likelihood that the transfer of the sheet P from the first conveying section 6 to the second conveying section 7 has been completed. Therefore, degradation in image quality of the images formed on the sheet P can be inhibited appropriately. Note that, in this case, the sheet P is conveyed such that the sheet P gradually goes slack while being conveyed by both of the first conveying section 6 and the second conveying section 7.

In the above-described embodiment, a single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

The present invention is also applicable to a liquid ejecting device that ejects liquid other than ink. Further, other than a printer, the present invention can also be applied to a facsimile machine or a copier.

What is claimed is:
1. A liquid ejecting apparatus comprising:
a first conveying device configured to convey a recording medium along a conveying path;
a second conveying device configured to convey the recording medium conveyed by the first conveying device along the conveying path, the recording medium being conveyed by only the first conveying device during a first period, by only the second conveying device during a second period, and by both the first conveying device and the second conveying device during a third period;
a liquid ejecting head disposed in the conveying path at a position between the first conveying device and the second conveying device and configured to eject liquid onto the recording medium;
a conveying speed estimating device configured to estimate a first conveying speed at which the recording medium is to be conveyed in the first period, and a second conveying speed at which the recording medium is to be conveyed in the second period;
a transition period setting device configured to estimate, based on the first conveying speed, a transition time at which a transition from the first period to the third period or a transition from the third period to the second period can occur, and set a transition period, within which one of the transition times is included, the conveying speed estimating device estimating a transition conveying speed at which the recording medium is to be conveyed during the transition period; and
a head controller configured to control the liquid ejecting head during a period prior to the transition period upon assuming that the recording medium is conveyed at the first conveying speed, configured to control the liquid ejecting head during a period after the transition period upon assuming that the recording medium is conveyed at the second conveying speed, and configured to control the liquid ejecting head during the transition period upon assuming that the recording medium is conveyed at the transition conveying speed, wherein the conveying speed estimating device estimates the first conveying speed and the second conveying speed so that the second conveying speed is faster than the first conveying speed irrespectively of the estimated transition time, wherein the conveying speed estimating device estimates the transition conveying speed so that the transition conveying speed monotonically increases from the first conveying speed to the second conveying speed during the transition period, wherein the conveying speed estimating device is configured to perform a transition conveying speed setting process, and in the transition conveying speed setting process, the conveying speed estimating device is configured to:

set a specific timing in the transition period;

set a calculating period having a center time coincide with the specific timing, a length of the calculating period being equal to or longer than a length of the transition period;

set a provisional speed such that the provisional speed changes from a first provisional speed to a second provisional speed at the transition time, the first provisional speed being a constant speed in a period before the transition time, the second provisional speed being a constant speed in a period after the transition time, the second provisional speed faster than the first provisional speed;

calculate an average speed of the provisional speed during the calculating period; and set the transition conveying speed at the specific timing to the calculated average speed, wherein the conveying speed estimating device repeatedly performs the transition conveying speed setting process a plurality of times while changing the specific timing in the transition period.

2. The liquid ejecting apparatus according to claim 1, further comprising:

a first detecting device configured to detect a conveying speed of the first conveying device; and a second detecting device configured to detect a conveying speed of the second conveying device, wherein the head controller controls the liquid ejecting head during the period prior to the transition period based on the conveying speed detected by the first detecting device and controls the liquid ejecting head during the period after the transition period based on the conveying speed detected by the second detecting device.

3. The liquid ejecting apparatus according to claim 2, wherein the first conveying speed is calculated from the conveying speed detected by the first detecting device.

4. The liquid ejecting apparatus according to claim 1, wherein the transition conveying speed gradually increases from the first conveying speed toward the second conveying speed during the transition period.

5. The liquid ejecting apparatus according to claim 1, wherein the transition conveying speed increases from the first conveying speed toward the second conveying speed in a stepwise manner during the transition period.

6. The liquid ejecting apparatus according to claim 1, wherein the transition period setting device sets a span of the transition period to a span that is longer in proportion to an increase in at least one of a conveying speed, a thickness, and a size of the recording medium.

7. The liquid ejecting apparatus according to claim 1, wherein each of the first conveying device and the second conveying device is a pair of conveying rollers configured to convey the recording medium while nipping the recording medium therebetween, a nipping force of the first conveying device being greater than a nipping force of the second conveying device.

* * * * *